Patented Feb. 20, 1934

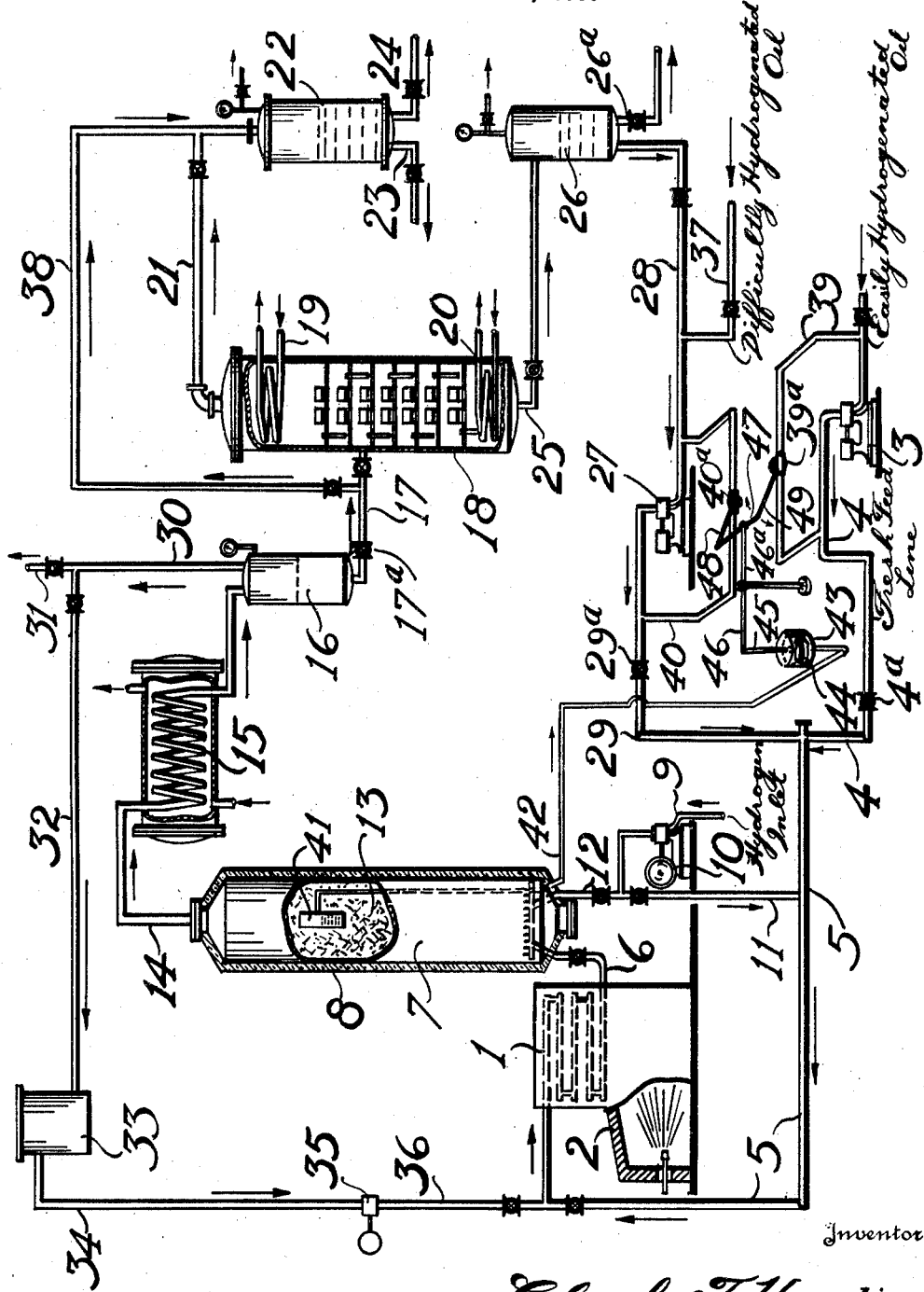

1,948,378

UNITED STATES PATENT OFFICE 1,948,378

HYDROGENATION OF HYDROCARBON MATERIALS

Clarke T. Harding, Elizabeth, N. J., assignor to to Standard-I. G. Company

Application October 8, 1930. Serial No. 487,135

5 Claims. (Cl. 196—53)

This invention relates to the hydrogenation of hydrocarbon oils and more specifically comprises a method of controlling the temperature in the reactors used in the hydrogenation.

The drawing is a semi-diagrammatic view in sectional elevation of one type of apparatus suitable for carrying out my process and for purposes of illustration, applies to a continuous recycling process of preparing anti-detonation hydrocarbons, suitable for motor fuel, from relatively higher boiling hydrocarbons.

In the drawing reference character 1 designates a heating coil mounted in a suitable furnace setting 2 preferably fired by gas, although other heating means may be used. Pump 3 forces fresh feed material through line 4 into line 5 and thence into coil 1 wherein it is heated to a temperature above 700° F. and preferably between about 800 and 950° F. The fresh feed is preferably a gas oil, cycle stock, or heavy naphtha fraction, but any petroleum fraction boiling between 300° F. and 800° F. is suitable. From coil 1 the heated material is discharged through pipe 6 into reaction chamber 7 which is adapted to withstand high pressure and temperature and is also resistant to attack by hydrogen and the reactants. Reactor 7 may be covered with a suitable insulating material 8 and preferably contains a hydrogenating catalytic material 13 which is immune to sulphur poisoning. The composition of this catalyst will be more fully described below.

Fresh hydrogen or a gas containing a substantial quantity of free hydrogen is drawn from a holder (not shown) through line 9 and raised to a pressure in excess of 20 atmospheres and preferably 200 atmospheres or more by compressor 10 and is then forced through line 11 to a junction with line 5 through which the feed oil is being forced by pump 3 so that a mixture of hydrogen and oil flows through coil 1 into reactor 7. If it is desired, hydrogen may be admitted directly to the reactor through line 12 or part of the hydrogen may flow through the coil and part directly into the reactor. Reactor 7 is maintained under pressure of about 3,000 pounds per square inch and at temperatures above 900° F. principally by the heat evolved in the hydrogenation of the hot oil, although additional heat may be furnished by other means. Hot reactants leave reactor 7 through line 14 and discharge into condenser 15 and thence into separating drum 16 wherein gas and liquid are separated. From separator 16 liquid is drawn off through line 17 past valve 17a, through which pressure is released from 3000 pounds per square inch to a considerably lower pressure, preferably atmospheric, and flows into a fractionating tower 18 wherein the lower-boiling hydrocarbons are separated from the higher-boiling hydrocarbons. Fractionating tower 18 may be equipped with a condensing coil 19 and a heating coil 20 the temperatures of which may be adjusted to separate the hydrocarbons at any desired boiling point.

Distillate consisting of the lower-boiling hydrocarbons leaves tower 18 through line 21 and discharges into drum 22 from which the product may be drawn off through line 23 and sent to storage (not shown), or may flow through line 24 to equipment for further treatment. Condensate from tower 18 flows through line 25 into drum 26 from which it may be drawn off through line 26a or drawn by pump 27 through line 28 and forced through line 29 into fresh feed line 5, as will be more fully described below.

Uncondensed gases, which contain a substantial quantity of hydrogen, leave separator 16 through line 30 and may be vented to the air through branch line 31 or may flow through line 32 into a purifier 33, in which hydrogen sulfide, ammonia and other impurities, as well as hydrocarbon gases may be scrubbed out. The purified gas flows thence through line 34 into booster compressor 35 which returns the gas to the reactor through line 36 and coil 1.

I have found that the fresh oil is in general more readily hydrogenated than the condensate or cycle oil from tower 18, and that it evolves a greater quantity of heat in the oven. It will be seen, therefore, that by varying the relative amounts of fresh oil and cycle oil in the feed it is possible to vary the amount of heat evolved in the oven and consequently to vary the temperature, without seriously changing the other operating conditions, such as pressure feed rate and time of contact.

There are a number of ways in which this can be done. For example, the flow of fresh oil and cycle oil through lines 24 and 29 into line 5 may be automatically regulated by the device indicated in the drawing in which bulb 41, filled with a fluid, such as mercury or sulfur dioxide, is placed inside the oven so that as the temperature in the oven changes the volume of fluid in bulb 41 will change. Bulb 41 is connected by line 42 to a chamber 43 in which a diaphragm 44 moves up or down as the fluid in bulb 41 expands or contracts. The movement of diaphragm 44 is communicated by levers 45, 46 and 46a to a valve control rod 47, which in turn is connected by levers 48 and 49 to valves 40a and 39a in by-pass lines 40 and 39. Valves 40a and 39a open and close in opposite directions, so that as rod 47 moves up and down one valve closes and the other opens by a proportionate amount. When valve 29a in line 29 and valve 4a in line 4 are open, and valves 40a and 39a are each open by the same amount, part of the oil pumped by pump 27 will be by-passed through line 40, and the same amount of oil from pump 3 will be by-passed through line 39. If now the temperature in the oven should rise, the fluid in bulb 41 would expand, diaphragm 44 would move up and would cause valve rod 47 to move down thus partly closing valve 40a and opening valve 39a. This means that less cycle oil by-passes through line 40, and more fresh oil by-passes through line 39, and consequently the amount of cycle oil flowing through line 29 increases and the amount of fresh oil flowing through line 4 decreases, while the total feed rate remains constant. The temperature in reactor 7 will fall, therefore, because the feed contains a greater amount of difficultly hydrogenated material than before. In a similar manner when the temperature falls valve rod 47 moves in the opposite direction and the amount of fresh oil flowing through line 4 into mixed feed line 5 increases, thus causing the temperature to rise again. It will be understood that the ratio of cycle oil to fresh oil in the feed will be such that over a long period the amount of cycle oil in drum 26 remains substantially constant, and that only for short periods will it be appreciably diminished. If, however, cycle oil should accumulate in drum 26, it is drawn off through line 26a.

It will be understood also that there are many other ways of regulating, either automatically or manually, the amounts of fresh oil and cycle oil in the mixed feed. For example, the pumps may be driven off drive shafts fitted with cone pulleys so arranged that one pump may be speeded up and the other proportionately slowed down. The pumps may also be driven by variable speed electric motors, or they may be calibrated so that by counting the number of strokes of each pump per minute, the rate of feed can be determined and adjusted, either automatically or by hand.

This method of adjusting the composition of the feed oil may also be used to maintain a constant temperature in the reactor. For example, it has been observed that as the catalyst ages, its activity decreases, and the temperature in the reactor drops, due to the decrease in the heat evolved by hydrogenation. By gradually increasing the percent fresh feed to keep pace with the diminishing activity of the catalyst, this falling off of the temperature can be offset, and the temperature held substantially constant.

Catalytic materials that may be used comprise the oxides or sulfides of metals of the II, IV and VI groups of the periodic system, or any mixtures of these. I have found that the oxides or sulfides of molybednum, tungsten, or chromium in combination with the oxides of magnesium or zinc are especially suitable.

It will be understood that my process is not limited to that described above, but may be applied equally well to the hydrogenation of any two oils one of which is more readily hydrogenated than the other. In these cases pump 3 for example, may feed the easily hydrogenated material and pump 27 the more difficultly hydrogenated material, which may be drawn in through line 37 from any suitable source (not shown). The liquid hydrogenated product from separator 16 in these cases may by-pass fractionating tower 18 and flow directly into drum 22, through line 38.

As an example of how my process operates a Light Mid-Continent gas oil is passed with hydrogen through a heating coil and discharged into a reactor maintained under 3000 pounds per square inch pressure and at temperatures above 900° F. which contains a mixture of tungsten and magnesium oxides, the vapors therefrom are fractionated and the heavy fractions of the hydrogenated product are continuously recycled. By increasing the percent fresh feed in the mixed feed from 60 to 69 the temperature in the reactor is raised from 965 to 984° F. Conversely by reducing the percent fresh feed in the mixed feed from 60 to 55 percent the temperature in the oven is reduced from 965 to 957° F.

This invention is not limited by any theory of the mechanism of the reactions nor by any examples given for illustrative purposes, but only by the following claims in which I wish to claim all novelty inherent in this invention.

I claim:

1. In a continuous recycling process for the destructive hydrogenation of petroleum hydrocarbons at temperatures above 700° F. and under pressure in excess of 20 atmospheres in which the mixture of fresh oil and recycled oil is first heated in a heating coil and then discharged into an enlarged reaction zone, the method of maintaining the temperature in the hydrogenation zone within the optimum range for destructive hydrogenation which comprises changing the proportion of recycle oil to fresh oil in the feed, at such times as the temperature in the hydrogenation zone is observed to fluctuate outside of the optimum range, to such an extent that the net exothermic heat of reaction is changed sufficiently to bring the temperature in the reaction zone back within the optimum range.

2. In a process for hydrogenating hydrocarbon material at high temperatures and pressure in the presence of a catalyst which promotes hydrogenation, the method of maintaining a substantially constant temperature in the hydrogenation zone which comprises adding to the feed oil, at such times as the temperature is observed to fluctuate, another oil which differs from the feed oil with respect to the amount of exothermic heat evolved by it upon hydrogenation and heating the two oils to substantially the same temperature before discharging them into the hydrogenation zone, whereby the net exothermic heat on reaction is changed sufficiently to bring the temperature back to the constant level sought to be maintained, and adjusting the relative amounts of the feed oil and added oil so that the total feed rate remains constant.

3. In a process for subjecting hydrocarbon oils to the action of free hydrogen at high temperatures and pressures in which the hydrocarbon oil is first heated in a heating coil and then discharged into an enlarged reaction zone, the method of maintaining the temperature in the reaction zone substantially at a predetermined level, which comprises changing the composition of the feed oil at such times as the temperature is observed to vary appreciably from the predetermined level by replacing a portion of the principal feed oil by another oil which differs from the principal feed oil with respect to the amount of exothermic heat evolved by it upon hydrogenation, heating the two oils to substantially the same temperature and discharging them into the reaction zone whereby the net exothermic heat of reaction is changed to such an extent that the temperature in the reaction zone is brought back to the predetermined level.

4. In a process for subjecting hydrocarbon oils to the action of free hydrogen at high temperatures and pressures in which the hydrocarbon oil is first heated by passage through a heating coil and then discharged into an enlarged reaction zone, the method of preventing an excessive rise of temperature in the reaction zone beyond a predetermined level, which comprises varying the composition of the feed oil at such times as the temperature is observed to rise above the predetermined level by replacing a portion of the principal feed oil by a substantially equivalent volume of another oil which differs from the principal feed oil in that it evolves less exothermic heat upon hydrogenation, heating the two oils to substantially the same temperature and discharging them into the reaction zone, whereby the net exothermic heat of reaction is decreased to such an extent that the temperature in the reaction zone is brought back to the predetermined level.

5. In a process for subjecting hydrocarbon oils to the action of free hydrogen at high temperatures and pressures in which the hydrocarbon oil is first heated in a heating coil and then discharged into an enlarged reaction zone, the method of preventing an excessive drop of temperature below a predetermined level which comprises varying the composition of the feed oil at such times as the temperature in the reaction zone is observed to fall appreciably below the predetermined level by replacing a portion of the principal feed oil by a substantially equivalent volume of another oil which differs from the principal feed oil in that it evolves a greater amount of exothermic heat upon hydrogenation, heating the two oils to substantially the same temperature and discharging them into the reaction zone, whereby the net exothermic heat of reaction is increased to such an extent that the temperature in the reaction zone is brought back to the predetermined level.

CLARKE T. HARDING.